United States Patent
Pires et al.

(10) Patent No.: US 9,141,871 B2
(45) Date of Patent: Sep. 22, 2015

(54) SYSTEMS, METHODS, AND SOFTWARE IMPLEMENTING AFFINE-INVARIANT FEATURE DETECTION IMPLEMENTING ITERATIVE SEARCHING OF AN AFFINE SPACE

(71) Applicant: Carnegie Mellon University, Pittsburgh, PA (US)

(72) Inventors: Bernardo Rodrigues Pires, Pittsburgh, PA (US); José M. F. Moura, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 72 days.

(21) Appl. No.: 13/645,865

(22) Filed: Oct. 5, 2012

(65) Prior Publication Data

US 2013/0089260 A1    Apr. 11, 2013

Related U.S. Application Data

(60) Provisional application No. 61/626,906, filed on Oct. 5, 2011.

(51) Int. Cl.
| | |
|---|---|
| G06K 9/00 | (2006.01) |
| G06K 9/46 | (2006.01) |
| G06K 9/62 | (2006.01) |

(52) U.S. Cl.
CPC ............ *G06K 9/4619* (2013.01); *G06K 9/4671* (2013.01); *G06K 9/6276* (2013.01); *G06K 9/6211* (2013.01)

(58) Field of Classification Search
None
See application file for complete search history.

(56) References Cited

U.S. PATENT DOCUMENTS

| | | | |
|---|---|---|---|
| 2004/0158592 A1* | 8/2004 | Nikitin et al. | 708/400 |
| 2005/0238198 A1* | 10/2005 | Brown et al. | 382/103 |
| 2006/0285755 A1* | 12/2006 | Hager et al. | 382/224 |
| 2007/0179921 A1* | 8/2007 | Zitnick et al. | 706/20 |
| 2008/0013836 A1* | 1/2008 | Nakamura et al. | 382/209 |

* cited by examiner

*Primary Examiner* — Hadi Akhavannik
(74) *Attorney, Agent, or Firm* — Downs Rachlin Martin PLLC

(57) ABSTRACT

Feature-matching methods for attempting to match visual features in one image with visual features in another image. Feature-matching methods disclosed progressively sample the affine spaces of the images for visual features, starting with a course sampling and iteratively increasing the density of sampling. Once a predetermined threshold number of unambiguous matches has been satisfied, the iterative sampling and matching can be stopped. The iterative sampling and matching methodology is especially, but not exclusively, suited for use in fully affine invariant feature matching applicants and can be particularly computationally efficient for comparing images that have large differences in observational parameters, such as scale, tilt, object-plane rotation, and image-plane rotation. The feature-matching methods disclosed can be useful in object/scene recognition applications. The disclosed methods can be implemented in software and various object/scene recognition systems.

50 Claims, 10 Drawing Sheets

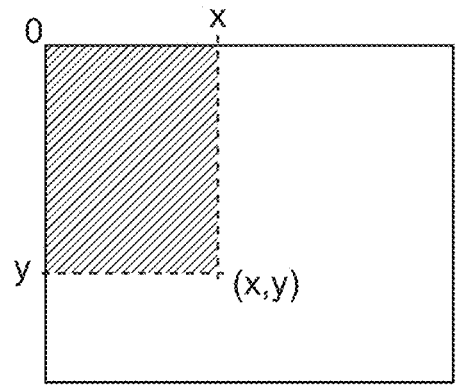
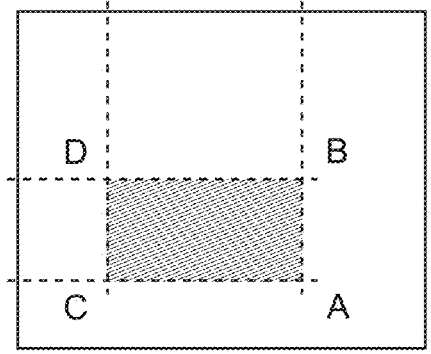
FIG. 6A            FIG. 6B
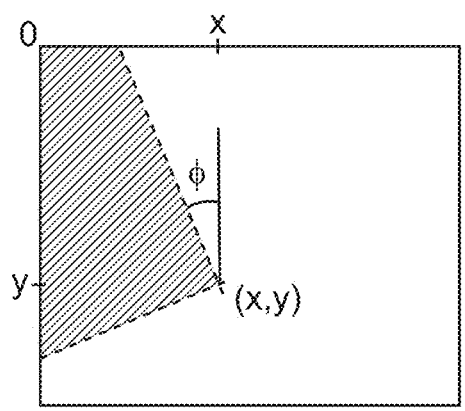
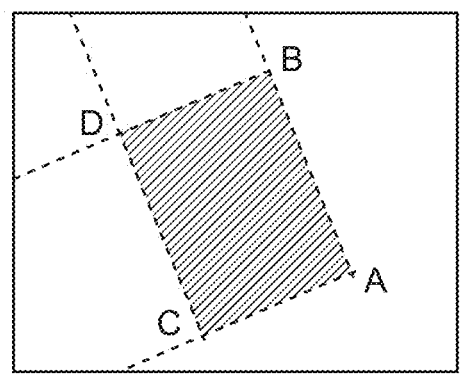
FIG. 7A            FIG. 7B

| | $\sigma$ | | | $t$ | $\phi(°)$ |
|---|---|---|---|---|---|
| 1ST Oct. | 2nd Oct. | 3rd Oct. | | | |
| 2.0 | 4.4 | 6.0 | | 1 | 0 |
| 2.8 | 6.0 | 8.4 | | 9/13 | 0 45 90 135 |
| 3.6 | 7.6 | 10.8 | | 9/19 | 0 34 63 108 135 162 |
| 4.4 | 9.2 | 13.2 | | 9/25 | 0 27 45 63 90 117 135 162 |
| 5.2 | 10.8 | 15.6 | | 9/37 | 0 18 34 45 56 72 90 108 124 135 146 162 |
| | | | | 9/51 | 0 18 27 34 45 56 63 72 90 108 117 124 135 146 153 162 |

SYSTEMS, METHODS, AND SOFTWARE IMPLEMENTING AFFINE-INVARIANT FEATURE DETECTION IMPLEMENTING ITERATIVE SEARCHING OF AN AFFINE SPACE

RELATED APPLICATION DATA

This application claims the benefit of priority of U.S. Provisional Patent Application Ser. No. 61/626,906, filed on Oct. 5, 2011, and titled "Methods for Affine Invariant Feature Detection," which is incorporated by reference herein in its entirety.

FIELD OF TELE INVENTION

The present invention generally relates to the field of computer vision. In particular, the present invention is directed to systems, methods, and software implementing affine-invariant feature detection implementing iterative searching of an affine space.

BACKGROUND

Automated feature-based image matching is a useful tool in many computer-implemented object/scene recognition applications from robotic vision to facial recognition, among many others. A number of feature-based image matching algorithms have been developed over the past 20 years. Many of these algorithms, such as the scale-invariant feature transformation (SIFT) algorithm, deal well with rotation and scaling as between a reference image and a query image. However, most of these algorithms are not robust enough to deal with full affine movement, for example when there is large movement of the camera and/or objects in the scene, and others that attempt to handle full affine movement are computationally very expensive and are, therefore, not practical for commercial and other real-world applications.

Several algorithms have been proposed that deal with the full affine movement and try to achieve robustness to affine movement by normalizing local patches, or regions, that have undergone an unknown affine distortion. Normalization transforms each of these regions into a standard form, where the effect of the affine transform has been eliminated. The best examples of such algorithms are the Harris-Affine and Hessian-Affine region detectors, and the "maximally stable extremal region" (MSER) algorithm. MSER, in particular, has been demonstrated to often have better performance than other affine invariant detectors (when a strong change of scale is present, however, SIFT still exhibits better performance than most other methods). It is important to note that none of these normalization algorithms are truly affine invariant because they start with initial feature scales and locations that are selected in a non-affine-invariant manner. In other words, even though these algorithms claim robustness or invariance to the affine model, their feature detection step is only invariant to the scale-plus-rotation model and thus they are not truly affine-invariant.

A very recent effort, the "affine SIFT" (ASIFT) algorithm, tries to achieve true affine invariance by searching the full affine space on a lower resolution version of the images. The best estimates for the affine movement are then tested on the full resolution images. In theory this algorithm is affine-invariant, but in practice it works by running the SIFT algorithm multiple times, which makes it slower and diminishes its applicability.

SUMMARY OF THE DISCLOSURE

In one implementation, the present disclosure is directed to a method of matching visual features within a first image with visual features within a second image. The method includes starting with a coarse sample, automatedly iteratively sampling visual features of each of the first and second images so as to continually increase sampling density of the sampling; and continuing the sampling until at least a desired number of unambiguous matches has been found between batches of the visual features of the first and second images detected in iterations of the iterative sampling.

In another implementation, the present disclosure is directed to an object/scene recognition method. The method includes: 1) automatedly generating a batch of feature descriptors for a plurality of sampled visual features of a first image; 2) automatedly generating a batch of feature descriptors for a plurality of sampled visual features of a second image; 3) automatedly performing a matching algorithm on the batches in attempt to find matches between the feature descriptors in the batch corresponding to the first image and the feature descriptors in the batch corresponding to the second image; 4) automatedly assessing the quality of matches; and if the quality of the matches does not meet a threshold, automatedly repeating the steps 1 through 4 with differing sets of batches until the quality of the matches meets or exceeds the threshold.

In still another implementation, the present disclosure is directed to a computerized method of identifying, from a plurality of reference descriptors, a nearest neighbor to a query descriptor. The computerized method includes automatedly generating an initial k-d Tree from an initial set of the plurality of reference descriptors and storing the initial k-d Tree in a memory; autoinatedly searching the initial k-d Tree for an initial nearest-neighbor of the initial set to the query descriptor; automatedly identifying a hyperball as a function of the initial nearest-neighbor; and automatedly generating a list of nodes to revisit as a function of the hyperball and storing the list in a memory.

In yet another implementation, the present disclosure is directed to a machine-readable storage medium comprising machine-executable instructions for performing an object/scene recognition method. The machine executable instructions include a first set of machine-executable instructions for performing at least the following steps: 1) generate a batch of feature descriptors for a plurality of sampled visual features of a first image; 2) generate a batch of feature descriptors for a plurality of sampled visual features of a second image; 3) perform a matching algorithm on the batches in attempt to find matches between the feature descriptors in the batch corresponding to the first image and the feature descriptors in the batch corresponding to the second image; 4) assess the quality of matches; and a second set of machine-executable instructions for determining if quality of the matches meets a threshold and automatedly repeating the steps 1 through 4 with differing sets of batches until the quality of the matches meets or exceeds the threshold.

In still yet another implementation, the present disclosure is directed to a machine-readable storage medium containing machine-executable instructions for performing a method of identifying, from a plurality of reference descriptors, a nearest neighbor to a query descriptor. The machine-executable instructions include a first set of machine-executable instructions for generating an initial k-d Tree from an initial set of the plurality of reference descriptors and storing the initial k-d Tree in a memory; a second set of machine-executable instructions for searching the initial k-d Tree for an initial nearest-neighbor of the initial set to the query descriptor; a third set of machine-executable instructions for identifying a hyperball as a function of the initial nearest-neighbor; and a fourth set of machine-executable instructions for generating a list of nodes to revisit as a function of the hyperball and storing the list in a memory.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 6A and 6B are diagrams illustrating the construction and use of an integral image;

FIGS. 7A and 7B are diagrams illustrating the construction and use of a rotated integral image;

DETAILED DESCRIPTION

Figure 1:
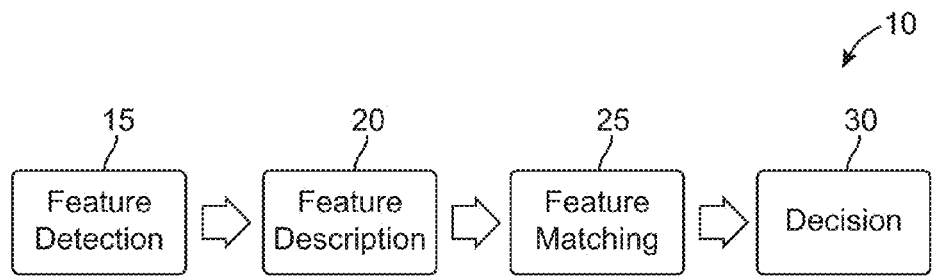
FIG. 1 is a flow diagram illustrating a conventional feature-based object/scene recognition method.

Aspects of the present invention include methods for feature-based object/scene recognition that are computationally efficient, especially when dealing with full affine movement caused by, for example, differences in camera (observation) location as between two images (herein referred to as a "reference image" and a "query image" or a "first image" and a "second image," or the like) being compared and/or differences in the location of one or more objects within the scenes of the images being compared. It is noted that the term "object/scene recognition" refers to the recognition of object(s) and/or scene in a query image based on the same object(s) and/or scene appearing in a reference image.

In contrast to conventional feature-matching methods in which corresponding complete sets of features in the reference and query images are located and described prior to feature matching, various methods of the present invention include iterative feature detection and description using a greedy algorithm and sampled subsets of all of the features within the images. Various methods of the present invention also utilize iterative feature matching techniques to perform the feature matching of the sampled feature points (which can be, e.g., pixels, voxels, or points between pixels or voxels) and their descriptions as between the two images. In many of the methods, an important aspect is the high invariance to observational differences between the images being compared. As will be described below in connection with specific examples, the observational differences are handled in the various algorithms presented by accounting for four distortions having geometric meaning, namely, one isotropic scaling ($\sigma$ parameter), one tilt ($\tau$ parameter), one object-plane rotation ($\phi$ parameter), and one image-plane rotation ($\psi$ parameter). As those skilled in the art will readily appreciate, other aspects of the present invention include software that implement the methods of the present invention in a computing environment, which can range from a single-processor environment to a multi-processor environment to a distributed multi-processor environment, among others, as well as include systems that implement such software.

As described in detail below, an object/scene recognition method of the present invention progressively searches an affine space, starting with a coarse sampling and iteratively increasing the density of the sampling until the full space has been searched. For example, such method starts by randomly extracting N' features from each of the images and attempting to find image matches based on these features. If the method does not find a sufficient number of unambiguous matches, then N' more features are randomly retrieved from each of the images and the algorithm searches for matches again. After each round of this procedure, the number of features detected increases, which corresponds to increasing the density of the affine space searched. This iterative/batch-processed procedure is superior to brute-force search of the full affine space (as proposed by ASIFT), because it allows stoppage of the search procedure as soon as a sufficient number of matches has been found.

For the sake of comparison of an object/scene recognition method of the present invention to conventional object/scene recognition methods, FIG. 1 illustrates an exemplary feature-based object/scene recognition method 10. At step 15, feature detection is performed. The objective of feature-detection step 15 is to determine the location and, possibly, other observational parameters of the features within each of the images being compared. Traditional approaches attempted to detect corners or edges in the images but most current state of the art methods detect features by searching for local extrema of a filtered version of the input image.

At step 20, feature description is performed. The objective of feature-description step 20 is to "describe" each of the features detected at step 15. Typically, step 20 consists of generating a k-dimensional vector that encodes the visual information surrounding each of the feature locations detected in step 15. There is a large body of work concerning the best way of encoding the visual information, but a popular choice is to use histograms of image gradients because they provide robustness to changes in illumination and to small changes in feature location.

At step 25, feature matching is performed. The objective of feature-matching step 25 is to find correspondences between the features in the two images based on their descriptors and location. In general, this is a combinatorial problem because it is necessary to compare each of the features in the query image to all of the features in the model image. Additionally, in typical usage cases, there is occlusion, noise and large movement distortions that create a large number of outliers (i.e., features in one image that do not have a corresponding match in the other image). Conventionally, step 25 of feature matching is not performed until each of the images has fully undergone the processing of feature detection at steps 15 and feature description at step 20.

Following matching step 25, at step 30 decision making is performed. The objective of decision-making step 25 is to use the information from all the previous steps to decide if the query image contains the object or scene represented in the model image. This is a step that is not emphasized by many authors since it may depend to a certain extent on the application. However, the present disclosure addresses decision making and concentrates on the more general case where no particular information about the object/scene can be assumed.

Figure 2:
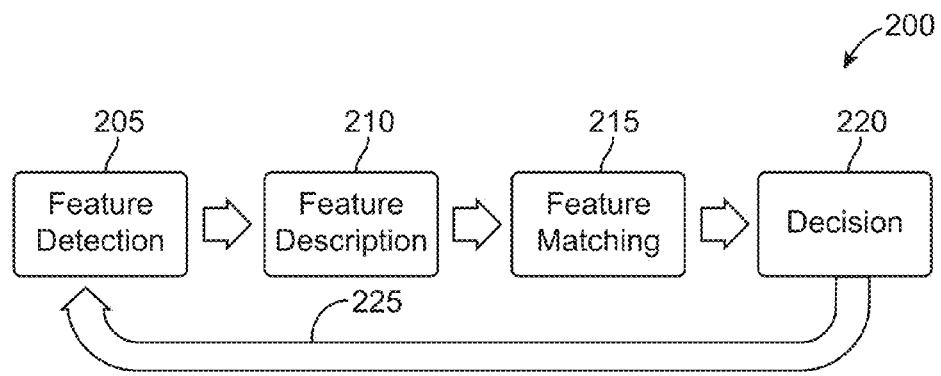
FIG. 2 is a flow diagram illustrating a feature-based object/scene recognition method of the present invention.

FIG. 2 illustrates an exemplary flow of an object/scene recognition method 200 of the present invention and can be contrasted against the convention flow of method 10 of FIG. 1. Referring to FIG. 2, as can be readily seen, method 200 has the same basic framework as method 10 of FIG. 1 in that it has a feature detection step 205, a feature description step 210, a feature matching step 215, and a decision making step 220. However, as indicated by loop 225, method 200 includes an iterative aspect. Generally, this iterative aspect performs feature detection (step 205), feature description (step 210), and feature matching (step 215) in batches on successive subsets of features and their corresponding identified feature points and descriptions. This allows method 200 to, in most cases, be computationally highly efficient, perhaps in all but the most observationally distorted and/or scene-dissimilar query images. This computational efficiency makes method 200 particularly suitable for implementing fully affine-invariant object/scene recognition algorithms.

Figure 3:
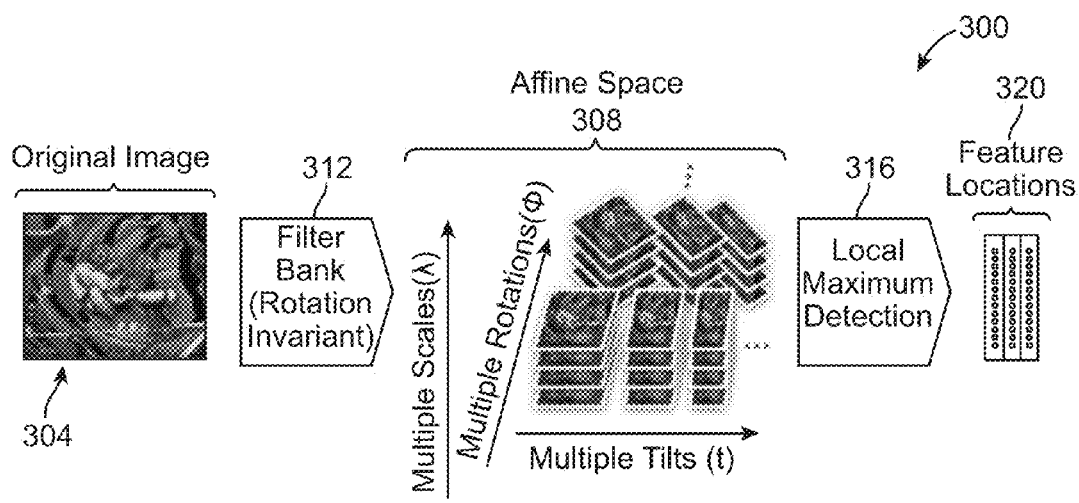
FIG. 3 is a diagrammatic representation of a feature-detection scheme of the present invention used to detect features iteratively in batches.

Before explaining the iterative, batch processing utilized by method 200, reference is first made to FIG. 3, which illustrates an exemplary feature-detection scheme 300 that provides full affine invariance. Scheme 300 starts with an image 304 to be matched. Image 304 can be either the reference image or the query image, depending on the stage of processing. From image 304, an affine space 308 is defined using an affine-space function, such as an affine-space function based on parameters x, y, σ, τ, and φ, where x and y are Cartesian coordinates of points within an image, and σ, τ, and φ are, respectively, the scale, tilt, and object-plane rotation observational parameters noted above. Consequently, in this example the affine-space function can be written as F (x, y, σ, τ, φ). As illustrated in FIG. 3, affine space 308 effectively contains an infinite set of images, here, integer images, that represent all suitable combinations of the observational parameters σ, τ, and φ. As described in detail below, features of image 304 are iteratively searched in batch fashion in affine space 308. In the example shown, the observation parameters (σ, τ, φ) are first sampled into a discrete set and, as illustrated at step 312, this discrete set is used in conjunction with a bank of box filters to compute a subset of the integer images. Then, at step 316, the discrete set of integer images is processed to detect local extrema to produce a set of feature locations 320.

Returning to method 200 of FIG. 2, but also referring to FIG. 3 where noted, at step 205 affine-invariant feature locations, 320 (FIG. 3) are detected by searching for local extrema (step 316 of FIG. 3) in the affine-space function F (x, y, σ, τ, φ). Instead of fully filtering the input images and then looking for local extrema of the filtered images (the approach of all major state-of-the-art algorithms), method 200 utilizes a novel greedy algorithm for feature detection and description. Briefly, this algorithm works by randomly deciding a starting location on the scale (σ) space and then exploring the neighborhood of that location until a local maximum (or minimum) is found. Upon convergence, the algorithm rejects features with low contrast and/or along edges to ensure that only the most stable features are detected.

Once a feature is detected, at step 210 its orientation ψ is estimated and a corresponding descriptor d is computed. In one example, the descriptor is a modified version of the SIFT descriptor that makes use of the observation information (σ, τ, φ) in order to achieve full affine invariance.

After features are detected and described, it is necessary to match them so that they can be used to recognize an object or scene. Traditional methods of feature matching use balanced k-dimension (k-d) Trees and rely on the fact that all features in both images have been detected and described before feature matching begins. Such methods, however, are not appropriate for an iterative framework.

Instead, at step 215 features are matched in a manner that allows for iterative/batch processing nature of method 200. In one example, step 215 implements a feature-matching algorithm that is based on the use of a novel iterative k-d Tree, which is described below in a detailed example. This new data structure is ideal for applications in which the number of features can increase at runtime for two primary reasons. First, it can be easily expanded to incorporate more reference features. Second, it stores information about previous queries so that they do not need to be re-run when new reference descriptors are introduced in the Tree. The present inventors have shown, both theoretically and experimentally, that the iterative k-d Tree gives superior performance for the task of matching features in growing databases.

After feature matching for a first batch of detected and described feature points has been performed, method 200 proceeds to step 220 where a decision is made as to the quality of the matching between the two images. As will be seen below, there are a number of ways to implement step 220. For example, a first approach utilizes homography estimation and verification, which is concerned with finding one or more groups of features that can be related by one or more homographies. After a possible homography is detected, it is inverted and applied to the image for verification. Only matches that agree with one of the homographies in the image are reported.

In a second approach utilizing a linear affine shape invariant correspondence (LASIC) algorithm, it is assumed that objects are rigid and that the global movement between images is affine. The decision problem is formulated as a hypothesis test and derives the uniformly most powerful (UMP) test that is invariant to the affine model. The matching problem is then formulated as a quadratic maximization in the space of permutation matrices. An efficient algorithm is then used to solve this maximization problem.

In a third approach utilizing shapes as empirical distributions, the shape of an object is interpreted as a probability distribution governing the location of the features of the object. An image of an object, therefore, corresponds to a random drawing from the shape distribution and can be analyzed as an empirical distribution. This framework allows for estimating geometrical transformations between images in a statistically meaningful way using maximum likelihood and for formulating the decision problem associated with shape classification as a hypothesis test that can characterize the performance.

In any of these or other approaches, the outcome of the decision making process at step 220 can be used to determined whether steps 205, 210, 215, and 220 should be repeated via loop 225 for another batch of feature points and corresponding descriptions. The decision can be based, for example, on whether or not the number of matches detected and verified meets a certain predetermined threshold value. Each of the foregoing steps of method 200 are illustrated below in a detailed example.

Figure 4:
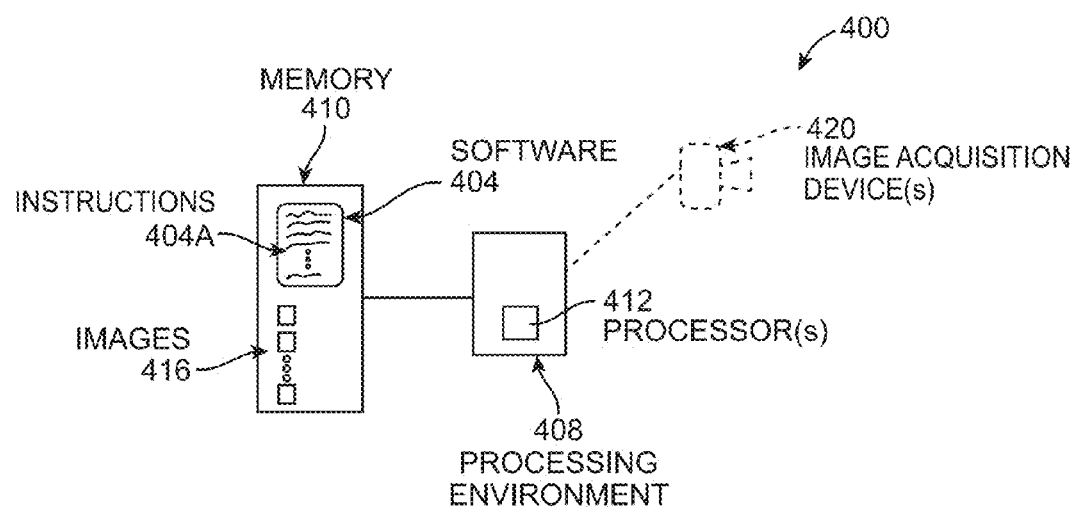
FIG. 4 is a high-level diagram of an object/scene capturing and recognition system made in accordance with the present invention.

Before proceeding to a specific detailed example that will further illustrate the broad aspects of methods of the present invention described above, an exemplary system 400 (FIG. 4) in which one or more of the methods disclosed herein can be implemented is first described. Referring to FIG. 4, system 400 includes object/scene recognition software 404 and a processing environment 408 that executes steps of the software. Software 404 implements an object/scene recognition method of the present disclosure, such as method 200 of FIG. 2. Software 404 can be stored in any suitable memory 410, which can be any non-volatile memory (e.g., magnetic storage, optical storage, bubble storage, etc.), any volatile memory (e.g., RAM, cache, etc.), and any combination of non-volatile and volatile memory. In addition, memory 410 is depicted as a single box so as to suggest a single location, those skilled in the art will readily appreciate that the memory can be located in a single location (e.g., on a single machine) or can be dispersed between/among multiple locations, such as might occur in a distributed computing environment. For convenience, the appended claims use the term "machine-readable storage medium" to denote any physical memory (ies) on which software 404 can reside. In contrast, the term "machine-readable medium" shall include not only machine-readable storage media, but also transitory media, such as propagating signals that can carry software in a suitable signal-encoded form.

As those skilled in the art will readily appreciate, software 404 includes machine-executable instructions 404A that encode aspects of the relevant object/scene recognition method and that can be executed by one or more suitable processors 412. For convenience, processor(s) are represented by a single box that might suggest a single location. Here, too, skilled artisans will readily recognize that in a multi-processor environment, the multiple processors can be local to one another or can be distributed, for example, across a local-area network, wide-area network, etc. Fundamentally, there are no limitations on how many processors 412 are involved in executing software 404 to provide the requisite functionality.

The object/scene recognition method encoded in software 404 operates on images 416 that can be stored in memory 410. Again, memory 410 can be any memory virtually anywhere, such that the memory(ies) containing software 404 and the memory(ies) containing images 416 do not necessarily have to be the same memories. Intermediate and final results (not shown) of executing software 404 can similarly be temporarily or permanently stored in memory. System 400 may optionally include one or more image-acquisition devices 420, such as one or more still-image cameras, video cameras, thermal imaging cameras, etc., for acquiring each reference and/or query image of images 416. As examples of possible embodiments of system 400, the system can be embodied in a server (not shown) that processes images from one or more image sources, in a camera body (not shown) to give the camera object/scene recognition functionality, in a workstation augmented with a camera to acquire query image to compare with one or more previously acquired reference images, in an autonomous vehicle to facilitate vehicle maneuvering based on machine vision, in wearable devices that facilitate recognition of objects in the user environment and/or facilitate user interaction with word-processing or other computing systems, etc. Those skilled in the art will readily appreciate that these are but a few examples of how system 400 can be instantiated into real-world applications.

EXAMPLE

1. Affine Invariance

As mentioned above, the iterative/batch-processing nature of methods of the present invention makes them computationally efficient, especially for complex object/scene recognition algorithms that are fully affine invariant. This section lays the groundwork for one example of an iterative affine-invariant feature detection algorithm. In section 1.1, the affine model is decomposed into four distortions that have geometric meaning: one rotation in the object plane, one rotation in the image plane, one isotropic scaling, and one tilt (or anisotropic scaling.) Section 1.2 introduces the scale-normalized Laplacian of Gaussian (LoG) filter that will be used as the basis of the exemplary feature detection scheme and shows that a filter bank consisting of LoG filters can achieve invariance to scale and rotation in the image plane. Section 1.3, details how the original LoG filter bank can be expanded to achieve invariance to the tilt parameter. Section 1.4 describes how invariance to rotation can be achieved in the object plane by using rotated integral images.

1.1 Affine Model Decomposition

Figure 5:
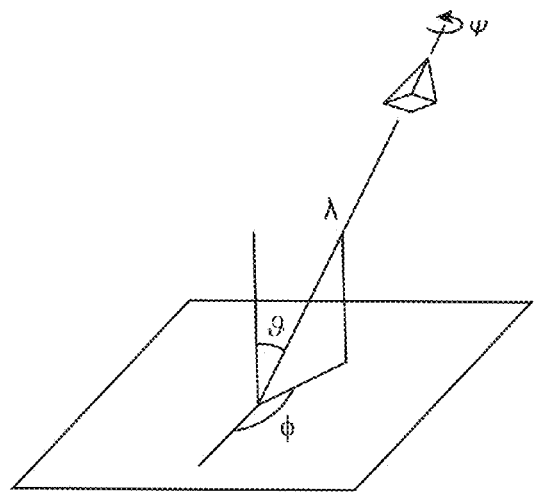
FIG. 5 is a diagram illustrating observational parameters used is aspects of the present invention implementing a fully affine invariant feature detection algorithm.

In this example, modeling the affine distortions is started by considering a small planar patch of an object o(x, y). Under the affine model, each point $x=[x, y]^T$ in the patch will be related to a point $u=[u, v]^T$ in the image by the Equation:

$$u = Ax + \delta \quad (1)$$

where A represents the 2×2 affine distortion matrix and δ represents a 2×1 displacement vector. The use of local features provides invariance to the displacement vector δ since features in different images can be matched regardless of their location. This allows u=Ax to be written. The affine distortion in A can be decomposed into a sequence of four distortions that have geometric meaning; scaling λ, rotation in the object plane φ, rotation in the image plane ψ, and angle of incidence θ:

$$A = \lambda R_1(\psi) T(\tau) R_2(\phi) \quad (2)$$

$$= \lambda \begin{bmatrix} \cos(\psi) & -\sin(\psi) \\ \sin(\psi) & \cos(\psi) \end{bmatrix} \begin{bmatrix} \tau & 0 \\ 0 & 1 \end{bmatrix} \begin{bmatrix} \cos(\phi) & -\sin(\phi) \\ \sin(\phi) & \cos(\phi) \end{bmatrix}$$

where λ>0 is the scaling parameter; the angle of incidence θ is related to the tilt parameter τ by θ=arccos 1/τ; Ri are rotation matrices; T is a tilt matrix (i.e., a diagonal matrix with first eigenvalue τ>1 and second eigenvalue equal to 1); and the rotation in the object plane φ is restricted to the range [0, π). FIG. 5 illustrates this decomposition. Note that θ=arccos 1/τ.

To achieve robustness to the full affine model, the present example starts with a method that is robust to scale λ and rotation in the image plane ψ(namely, a scale-normalized LoG detector) and search for features in the space of all deformations that can be obtained by changing (τ, φ) in the Movement Model (2).

1.2 Invariance to Scale and Rotation in the Image Plane

The starting point in the construction of the exemplary feature detector is the scale-space function F (x, y, σ) defined as the output of the convolution of the image with a scale-normalized LoG filter (where ⊗ is used to represent convolution):

$$F(x, y, \sigma) = I(x, y) \otimes L_\sigma(x, y). \tag{3}$$

The scale-normalized LoG filter is defined by:

$$L_\sigma(x, y) = \sigma^2 \nabla^2 G(x, y) \tag{4}$$
$$= \sigma^2(G^{xx}(x, y) + G^{yy}(x, y))$$

where $G^{xx}(x, y)$ and $G^{yy}(x, y)$ correspond to the second order derivatives in x and y of the Gaussian filter:

$$G^{xx}(x, y) = \frac{1}{2\pi\sigma^2}\exp\left(-\frac{x^2+y^2}{2\sigma^2}\right)\left(\frac{x^2-\sigma^2}{\sigma^4}\right) \tag{5}$$

$$G^{yy}(x, y) = \frac{1}{2\pi\sigma^2}\exp\left(-\frac{x^2+y^2}{2\sigma^2}\right)\left(\frac{y^2-\sigma^2}{\sigma^4}\right)$$

The scale-space function F (x, y, σ) in Equation (3) has been studied, and it has been shown that the normalization factor σ² is required for scale invariance. It has also been demonstrated experimentally that it produced the most stable features when compared with several other functions such as the gradient, Hessian, or Harris detector.

Writing the filter in polar coordinates (r, θ), shows that it is rotation invariant:

$$L_\sigma(r, \theta) = \frac{1}{2\pi}\exp\left(-\frac{r^2}{2\sigma^2}\right)\left(\frac{r^2-2\sigma^2}{\sigma^4}\right) \tag{6}$$

and, therefore, invariant to the rotation parameter ψ. Additionally, the objective function F (x, y, σ) in Equation (3) depends not only on the spatial coordinates x and y, but also on the scale parameter σ. This emphasizes the fact that each filter detects features at a specific scale. Computing the image responses to multiple filters allows one to search for features at multiple scales $\{\sigma_n\}_{n=11}^N$ and therefore achieve scale invariance, i.e., invariance to the λ parameter in the affine movement model.

1.3 Invariance to Tilt

To obtain invariance to the tilt parameter, the scale-space function is modified to simulate the effect of the tilt on the image. According to the movement model, in order to incorporate the effect of the tilt parameter τ, it is desired to compute the output of the filter not on the input image I (x, y) but on an image of the form $I_\tau$ (x, y)=I (τ x, y) that incorporates the τ parameter; i.e., it is desired to compute:

$$F(x, y, \sigma, \tau) = I_\tau(x, y) \otimes L_\sigma(x, y) \tag{7}$$

An objective is to include this "subsampling" on the x coordinate effect into the filters. To do so, it is noted that 2-D convolution between the image $I_\tau$ (x, y)=I (τ x, y) and the filter $L_\sigma$ (x, y) is equivalent to:

$$(I_\tau \otimes L_\sigma)(x, y) = \int\int I_\tau(u, v) L_\sigma(x-u, y-v) du dv \tag{8}$$
$$= \int\int I(\tau u, v) L_\sigma(x-u, y-v) du dv$$
$$= \int\int I(u_1, v) L_\sigma\left(x-\frac{u_1}{\tau}, y-v\right)\frac{du_1}{\tau} dv$$
$$= \frac{1}{\tau}\int\int I(u_1, v) L_\sigma\left(\frac{\tau x-u_1}{\tau}, y-v\right) du_1 dv$$
$$= \int\int I(u_1, v) L_{\sigma,\frac{1}{\tau}}(\tau x-u, y-v) du_1 dv$$
$$= \left(I \otimes L_{\sigma,\frac{1}{\tau}}\right)(\tau x, y)$$

where the coordinate change $u_1=\tau u$ and the filter $L_\sigma$, $1/\tau(x, y)=1/\tau\, L_\sigma$ (1/τ x, y) are introduced. For convenience, t=1/τ is defined as the inverse of the tilt parameter with t ∈(0, 1). This allows it to be written that:

$$L_{\sigma\tau}(x, y) = \tau\sigma^2 \nabla^2 G_\sigma(tx, y) \tag{9}$$
$$= \tau\sigma^2(G_\sigma^{xx}(tx, y) + G_\sigma^{yy}(tx, y))$$
$$= \frac{t}{2\pi}\exp\left(-\frac{t^2x^2+y^2}{2\sigma^2}\right)\left(\frac{t^2x^2+y^2-2\sigma^2}{\sigma^4}\right)$$

and $$F(x, y, \sigma, t) = (I \otimes L_{\sigma t})\left(\frac{1}{t}x, y\right) \tag{10}$$

which proves that the anisotropic subsampling distortion by τ in the image may be modeled by the opposite distortion on the filter $L_\sigma$ followed by a subsampling in the outcome of the convolution.

1.4 Integral Images and Invariance to Rotation in the Object Plane

Several works have shown that box filters and integral images can be used to greatly speed up various computing intensive operations. As illustrated in FIG. 6A, the integral image (or "summed area table") is defined such that its value at any pixel is equal to the sum of all the values of the previous rows and columns; i.e., if I(x, y) is an image, the integral image Ī(x, y) is defined as:

$$\bar{I}(x, y) = \Sigma_{m=0}^x \Sigma_{n=0}^y I(m, n) \tag{11}$$

The integral image can be computed using four sums per pixel if a recursive (raster-scan) algorithm is used:

$$\bar{I}(x, y) = \bar{I}(x-1, y) + \bar{I}(x, y-1) - \bar{I}(x-1, y-1) + I(x, y) \tag{12}$$

Or, if separate row sums are maintained, using only two sums per pixel

As FIG. 6B shows, once the integral image is constructed, the sum of the pixel values in any rectangular area of the image can be computed in constant time, i.e., the sum of all the pixels inside the rectangle {A, B, C, D}, is equal to Ī(A)−Ī(B)−Ī(C)+Ī(D). This shows that the integral image can be used to quickly compute the output of a filter comprised of a single rectangular section, or box.

To simulate the rotation in the object plane, φ, the function F (x, y, σ, t) in Equation (10) is modified to incorporate the effect of a rotation in the input image; i.e., instead of applying the filter $L_{\sigma t}$ (x, y) on the input image I (x, y), the filter is applied on the rotated image Iφ (x, y)=I (x cos(φ)−y sin(φ), x sin(φ)+y cos(φ)). That is, the objective function is:

$$F(x, y, \sigma, t, \phi) = (I_\phi \otimes L_{\sigma t}) \left( \frac{1}{t} x, y \right) \quad (13)$$

Thus, to simulate the rotation φ, this example uses rotated integral images as illustrated in FIGS. 7A and 7B. Like the regular integral images in FIGS. 6A and 6B, the construction of a rotated integral image allows computation of the sum of the pixel values in any rotated rectangle in the image in constant time. This allows development of a box filter for the case when φ=0 and using it to achieve invariance to a φ-rotation by using a rotated integral image. Additionally, note that it is possible to achieve the same invariance by computing the integral image of a rotated version of the original image.

2. Filter Bank

This section describes the construction of the filter bank used for feature detection in the present example. Section 2.1, starts with the affine-space function F (x, y, σ, t, φ) in Equation (13) and samples the space of all observation parameters (σ, t, φ) into a discrete, set, and, section 2.2 creates a box filter bank that allows computation of the affine space function for each combination of the observation parameters.

2.1 Sampling of the Observation Parameters

In the previous section, it was seen that the objective function F (x, y, σ, t, φ) in Equation (13) describes the output of a scale-normalized LoG filter with parameter σ with an image that was distorted by the observation parameters (t, σ, φ). In order to find features, it is desired to search for local extrema of this function. However, the size of the space spanned by all possible values of (σ, t, φ) is too large to examine, and thus it is desired to sample it coarsely.

The affine space is first sampled based on the σ parameter. In this example, the space is divided into octaves, with each octave coarsely related to an approximate doubling of the σ parameter. Unlike SIFT, where each octave corresponds to a halving of the resolution of the image, the size of the integral images of this example does not change when searching different octaves (since the cost of a filtering operation remains the same regardless of the scale). Instead, the step of the grid searched is doubled. In most practical applications, the initial grid corresponds to double the resolution of the input image. This allows detection of feature points with sub-pixel accuracy, which leads to a larger number of more stable features.

Figures 8, 9:
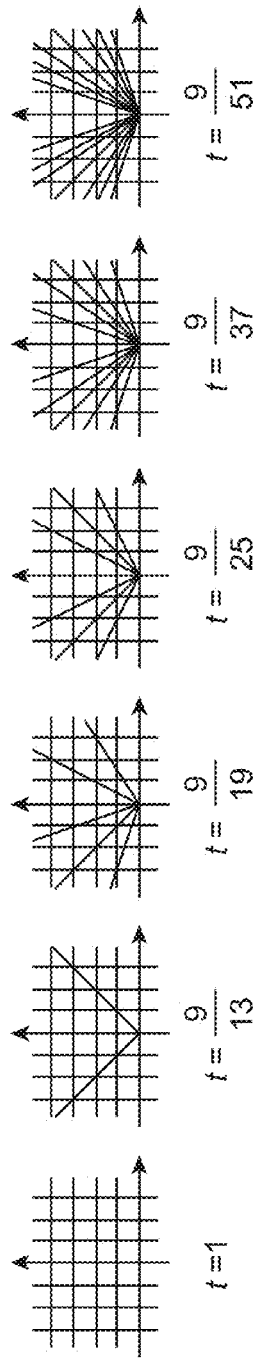
FIG. 8 is a table of sampled observational parameters used in an exemplary object/scene recognition algorithm of the present invention.
FIG. 9 is a set of graphs illustrating the tilt/object-plane rotation combinations appearing in the Table of FIG. 8.

For each octave, the objective function F (x, y, σ, t, φ) is sampled at five values of the σ parameter. As discussed in Section 3.1, below, to detect a point at scale $\sigma_0$, the present exemplary algorithm inspects the scales above and below it. This means that searching is limited to features in three scales for each octave. In order to cover the scale space more uniformly, overlap is allowed for between scales. The Table of FIG. 8 shows the values of σ used.

Figure 10:
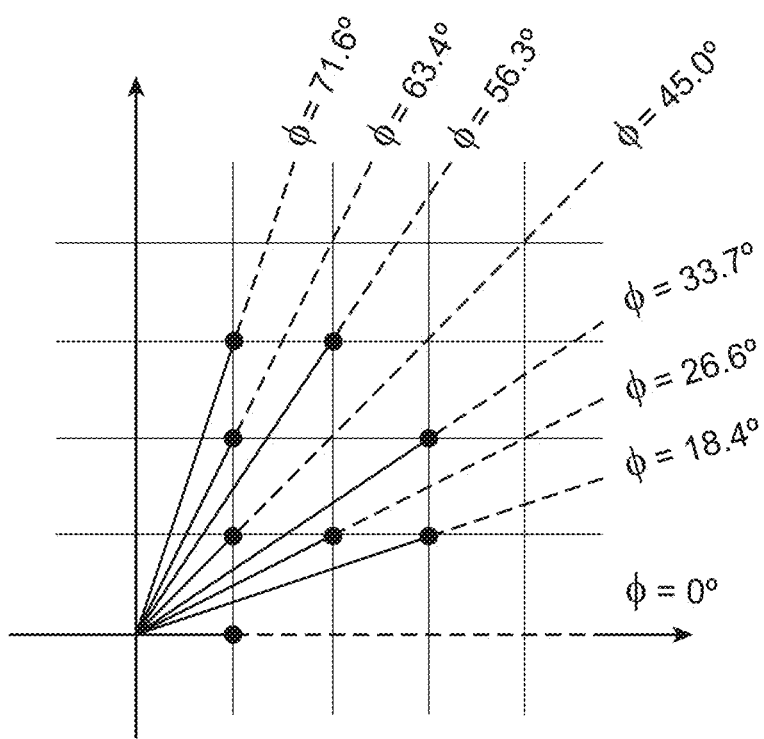
FIG. 10 is a graph illustrating values of object-plane rotation angles used in connection with the samples of the table of FIG. 8.

Although the sampling of σ can be decoupled from the sampling of the other observation parameters, the sampling of the t and φ must be related. To see why, it is sufficient to note that, when t=1 (i.e., θ=0 and the object is observed in a frontal view,) the angles ψ and φ degenerate into a single rotation, and thus it is sufficient to sample one φ value (namely, φ=0). However, as the angle θ increases and t→0, the object becomes more distorted, and it is necessary to sample φ more finely in order to find all the relevant feature points. Table 800 of FIG. 8 shows the (t, φ) combinations used, and FIG. 9 plots these combinations to illustrate how this example covers the range of φ values from 0° to 180°. As illustrated in FIG. 10, the values of φ were chosen to facilitate the creation of the rotated integral images. Note that, by carefully choosing the values of φ and by rotating the filters when φ is greater than 90°, the exemplary algorithm only requires the construction of a total of 8 integer images per input image.

2.2 Filter Bank

Since this example uses rotated integral images to model the rotation φ in the exemplary objective function F (x, y, σ, t, φ), the filters used in the algorithm incorporate only the values of σ and t and thus must follow Equation (9).

One possible way of creating the filter bank is to substitute all the σ and t values in Table 800 of FIG. 8 into this equation and then create box filter approximations of all the filters. Although this is possible, experiments showed that superior results could be obtained if a single approximation with box filters is created (for the initial values of $\sigma_0$=2.0 and $t_0$=1) and then adapted so that it approximates the function in Equation (9) for all the desired values of σ and t. This method is preferred because it ensures that all the filters used have the same symmetries and number of boxes.

Figures 11A, 11B:
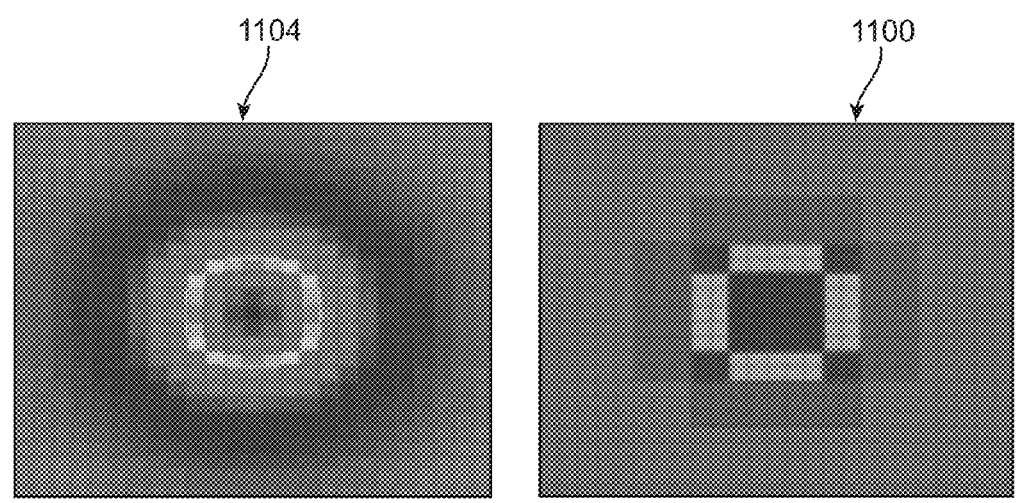
FIGS. 11A, 11B, and 11C are, respectively, an illustration of a box filter, an illustration of an approximation of the box filter of FIG. 11A, and a diagram illustrating the basic boxes used to construct the approximation of FIG. 11B.
Figure 11C:
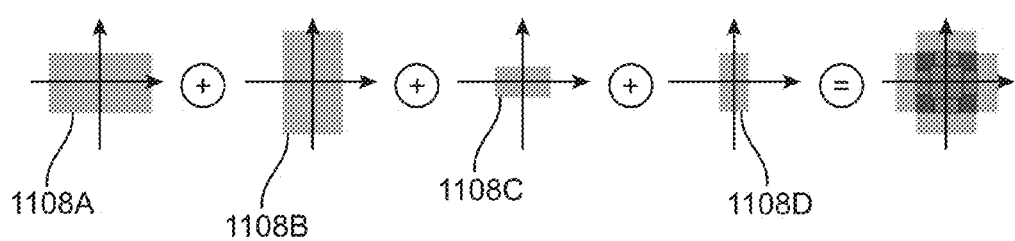

FIG. 11B shows this initial filter approximation 1100 of the original filter 1104 shown in FIG. 11A. It is interesting to note that, although the filter seems complex, it only requires four boxes 1108A to 1108D as shown in FIG. 11C. In order to simplify the computations, the weights of each box are set to −1 for boxes 1108A and 1108B and 3 for boxes 1108C and 1108D. Additionally, the output of filter 1100 is divided by the total area of the filter (15×15=225 in this case) to ensure that all filters have a constant Frobenius norm and therefore can be compared.

Based on filter 1100 in FIG. 11B, the remaining filters in the filter bank can be constructed by the following procedure:

- Since the parameter σ has the effect of scaling the filter coordinates isotropically (by an amount proportional to σ), in order to produce a filter with parameter $\sigma_k$=k×$\sigma_0$, both the x and y coordinates of the original filter are scaled by k.
- Since the parameter t has the effect of scaling only the x filter coordinate (by an amount inversely proportional to k), in order to produce a filter with parameter $t_k$=1/k×$t_0$, the x coordinate of the original filter are scaled by k.

Figure 12:
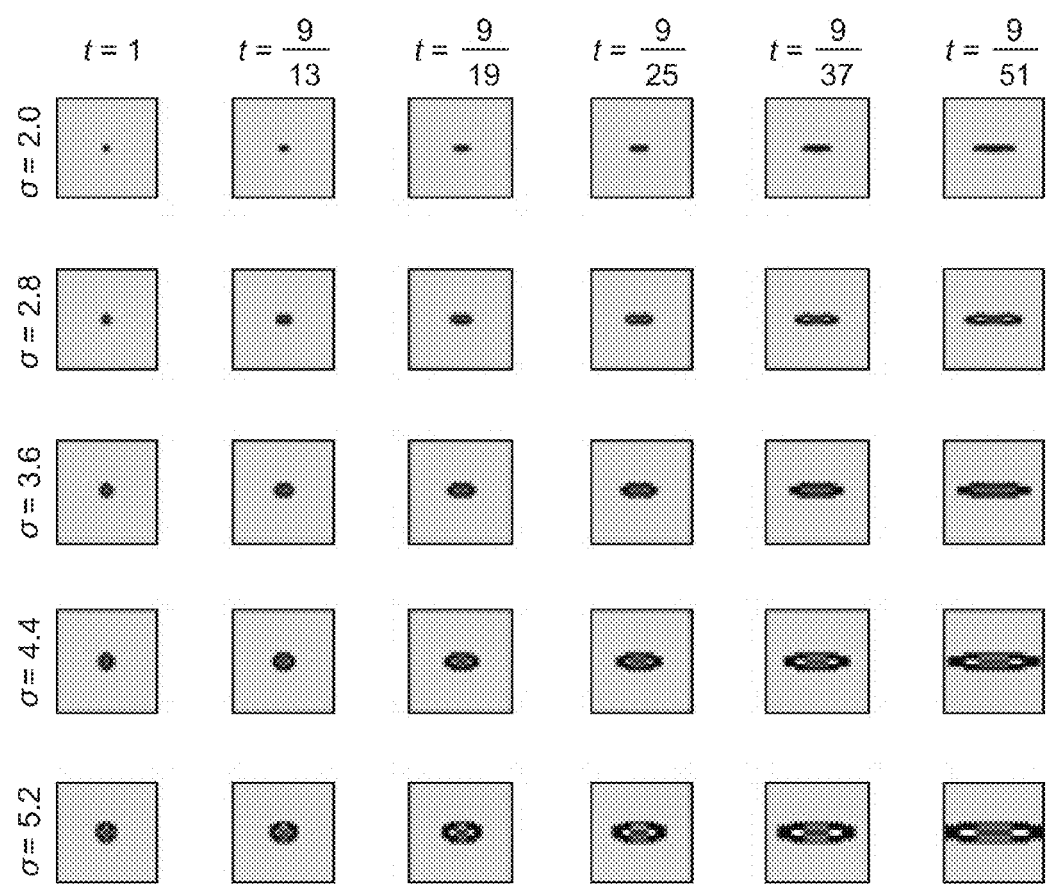
FIG. 12 is an illustration containing a subset of box filters in a filter bank for the first octave of the scale observational parameter for various values of the tilt and object-plane rotation angles.

For certain values of the parameter $t_k$, it is not possible to scale the filter so that the coordinates of all boxes are integer numbers. In this case the parameter k is adjusted so that all boxes have integer corners and the proportions of the filter are maintained. FIG. 12 shows all the filters corresponding to the first octave of σ.

3. Iterative Feature Detection and Description

In this section exemplary feature detection and description algorithms are described. In section 3.1, a greedy algorithm that is used to detect features one at a time is described. Sections 3.2 and 3.3 describe the algorithms for orientation assignment and feature description.

3.1 Iterative Feature Detection

An exemplary greedy detection algorithm starts by randomly selecting values of (σ, t, φ) from the set of samples of the observation parameters detailed in Section 2.1. For each set of observation parameters, the algorithm then selects a random starting location ($x_0$, $y_0$) and decides whether the search is for a maximum or a minimum. Based on these parameters, a greedy algorithm is used to find a local maximum or minimum as required.

When it starts, the exemplary object/scene recognition algorithm selects starting locations randomly. However, after several batches of features have been found and matched, the algorithm determines if there is any significant region of the image for which there are no matches. If so, the feature detection is restricted to this region. This allows the algorithm to search difficult sections of the image more thoroughly, while avoiding the search for features in sections that have already been matched.

In this example, the detection algorithm consists of three phases. In the first phase the filter bank described in section 2.2 is used to compute the value of the objective function at $(x_0, y_0)$ and its nearest neighbors in the x and y directions. A total of 8 neighbors are observed (including the diagonals) and the algorithm moves to the smallest or largest of the neighbors (depending on whether it is searching for a maximum or a minimum.) This process is repeated until the algorithm converges.

Figure 13:
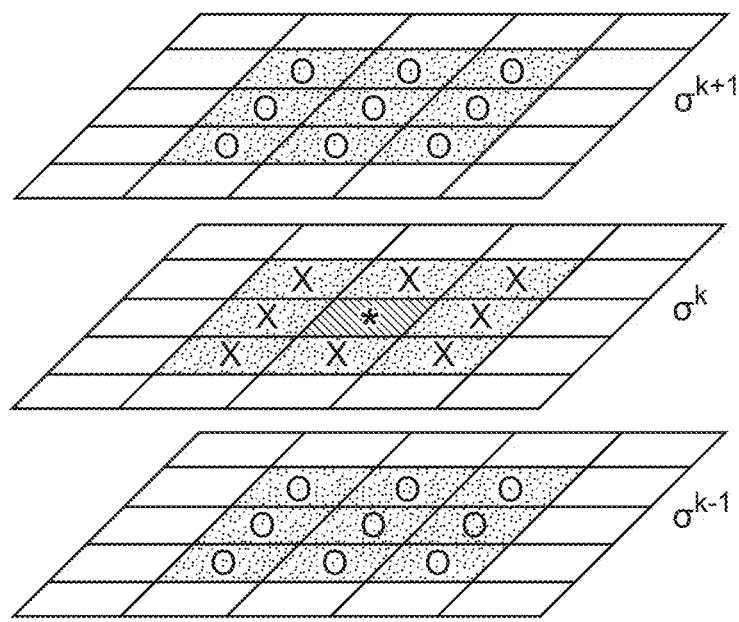
FIG. 13 is a diagram illustrating a searching algorithm for searching candidate features in an affine space.

The point found by this procedure is not necessarily a local extreme point of the objective function $F(x, y, \sigma, t, \phi)$ in Equation (13) since it is only greater or smaller than its neighbors in the x and y directions. In the second phase, the stability of the features found can be improved by verifying that the point is a local extreme point. In one example, this is done by comparing the point to its 18 neighbors in the scale above and below as illustrated in FIG. 13.

In the first phase of the feature detection algorithm the central point * is compared to its eight neighbors×in the same scale $\sigma^k$. In the second phase, the central point * is compared to its 18 neighbors ○ in the scales above a $\sigma^{k+1}$ and below $\sigma^{k-1}$. In theory, the point should be compared with its neighbors in the t and $\phi$ directions. In practice, however, making these comparisons increases the running time and reduces the number of features found without significantly improving the global performance of the algorithm. Additionally, to further improve the stability of the features detected, in the third phase candidate features are rejected that have low contrast or that are situated along edges. It is important to reject these features because they are poorly localized and therefore more susceptible to noise.

First, in order to remove low contrast features, it is required that the absolute value of the affine space function $|F(x, y, \sigma, t, \phi)|$ be greater than a threshold $K_{|F|}$. Second, in order to remove features along edges, the ratio of principal curvatures at the feature point is used. A high ratio of principal curvatures indicates that the image gradient is very strong in one direction (perpendicular to the edge) and weak in the other direction (along the edge).

To compute the ratio of principal curvatures, this example starts by constructing the Hessian matrix at the location and observation parameters of the feature:

$$H = \begin{bmatrix} D_{xx} D_{xy} \\ D_{xy} D_{yy} \end{bmatrix} \quad (14)$$

To compute the ratio of principal curvatures it is not necessary to explicitly determine the eigenvalues of H. Instead, if it is desired to ensure that the ratio between the largest eigenvalue and the smaller one is below $K_r$, it is sufficient to ensure that:

$$\frac{Tr(H)^2}{Det(H)} < \frac{(K_r + 1)^2}{K_r} \quad (15)$$

where Tr (H) and Det (H) denote the trace and the determinant of the H matrix in Equation (14).

3.2 Orientation Assignment

The feature detection strategy described in the previous section finds the location $(x_0, y_0)$ and observation parameters $(\sigma_0, t_0, \phi_0)$ of each feature. Before a feature can be matched, it is necessary to estimate the orientation of the feature $\psi_0$ and to create a descriptor d that accurately describes the neighborhood of the feature. The exemplary method presented here is adapted from SIFT in order to be affine invariant. The gradients of the image in a neighborhood of the feature point is used to estimate both the orientation $\psi_0$ and the descriptor d of each feature point.

Figure 14:
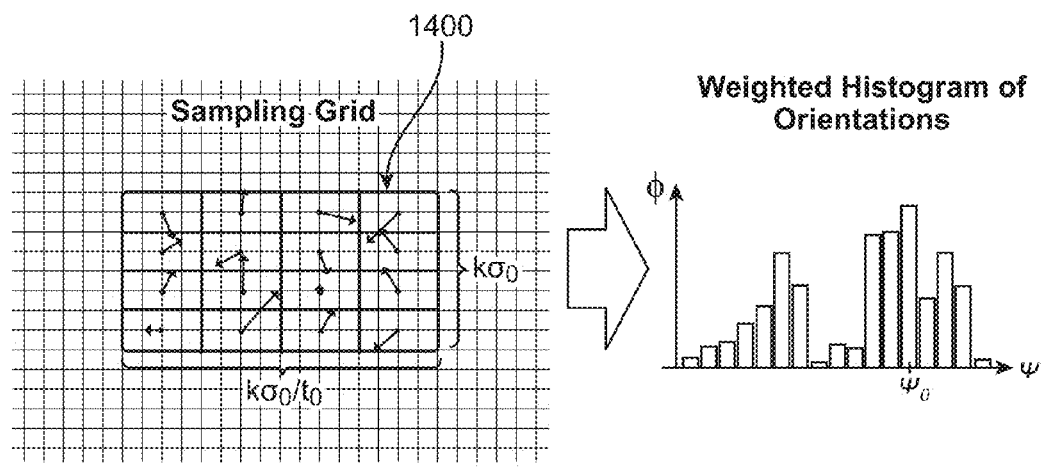
FIG. 14 is an illustration showing an exemplary sampling grid and a weighted histogram of orientations of features within the sampling grid.

First, a Gaussian filter with $\sigma = \sigma_0$ is applied to the original image and sample the filter output, $G(x, y)$, in a rectangular grid surrounding the feature point extracted from the rotated integral image corresponding to $\phi_0$. To achieve affine invariance, the grid is normalized by the values of the observation parameters $\sigma_0$ and $t_0$, as shown in FIG. 14. The derivatives of $G(x, y)$ is computed:

$$G_x(x, y) = G(x+1, y) - G(x-1, y)$$

$$G_y(x,y) = G(x, y+1) - G(x, y-1) \quad (16)$$

Using these functions, the magnitude and orientation of the gradient of the objective function in the neighborhood of the detected feature point is computed:

$$M(u, v) = \sqrt{G_x(x + t\sigma u, y + \sigma v)^2 + G_y(x + t\sigma u, y + \sigma v)^2} \quad (17)$$

$$\Phi(u, v) = \tan^{-1}\left(\frac{G_y(x_0 + t\sigma u, y_0 + \sigma v)}{G_x(x_0 + t\sigma u, y_0 + \sigma v)}\right)$$

where the are tangent computation produces values in the range of $(0, 2_\pi)$ by taking into account the quadrant where $(G_x(x+t\sigma u, y+\sigma v), G_y(x+t\sigma u, y+\sigma v))$ lies.

The orientation of the feature point $\psi_0$ is assigned by computing a weighted histogram of the gradient orientation $\Phi(u, v)$ in a process similar to SIFT. First, the range of $\Phi$ is divided into 36 bins (corresponding to intervals of 10°). For each (u', v') in the region $[-6, 6] \times [-6, 6]$, the magnitude function M (u', v') is weighted by a Gaussian with standard deviation 1.5 (measured in the normalized coordinates (u, v)) and centered at the feature point and add the result to the bin corresponding to $\Phi(u', v')$.

Once the weighted histogram is complete, the orientation of the feature point corresponds to its maximum as illustrated in FIG. 14, which is an example of a grid 1400 used for the orientation assignment. Note that grid 1400 is sampled from the rotated integral image corresponding to $\phi_0$ and is adjusted to take into account the location of the feature and the observation parameters $\sigma_0$ and $t_0$ (and therefore does not necessarily align with the pixel grid.) For clarity, the sample region is shown as a 4×4 grid whereas in practice, a larger grid is used. To increase the stability of the algorithm, additional orientations are assigned to the feature point if they correspond to maximums that are above 80% of the global maximum. The location of all maximums is then refined by using quadratic interpolation with the two nearest bins.

3.3 Local Descriptor

Figure 15:
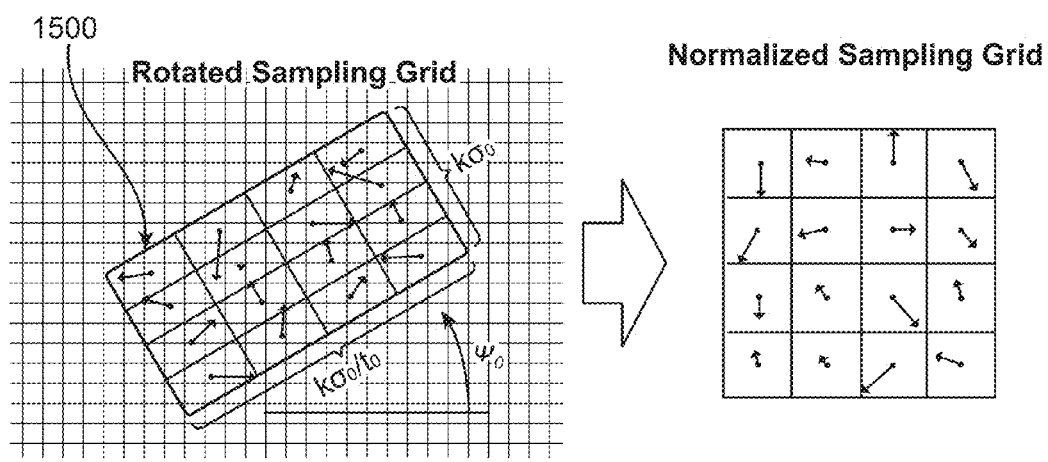
FIG. 15 is an illustration showing an exemplary rotated sampling grid and a resulting normalized sampling grid.

The computing of the local descriptors is started by recomputing the magnitude and orientation of the gradient of $G(x, y)$ in a neighborhood of the feature point that is normalized not only to the $\sigma_0$ and $t_0$ observation parameters but also the orientation parameter $\psi_0$ estimated in Section 3.2, FIG. 15 shows the extraction of a grid 1500 that simulates all the parameters as well as the normalized version of the same grid. Note that grid 1500 is sampled from the rotated integral image corresponding to $\phi_0$ and is adjusted to take into account not only the observation parameters $\sigma_o$ and $t_0$, but also the orientation $\psi_0$ estimated in Section 3.2. For clarity, the sample region is shown as a 4×4 grid whereas in practice, a larger grid is used.

To compute the descriptor d in this example, a 16×16 grid around the feature point location is extracted and weighed by a Gaussian function with standard deviation of 8 (in the normalized (u, v) units) and centered at the feature point. This grid is then divided into sixteen 4×4 sections and a 8-bin weighted histogram of gradient orientations is computed for each section. To avoid boundary effects in which the descriptor changes abruptly for a small change in feature location, trilinear interpolation is used to distribute the value of each gradient sample into the eight nearest bins.

The resulting histograms are concatenated to form a 4×4× 8=128 dimensional descriptor vector d. To reduce the effect of illumination changes, the vector is normalized to unit length and entries of the vector are thresholded so that no single entry has a weight greater than 0.2 (if any entries are thresholded, the vector is normalized again so that its length is 1).

4. Feature Matching

This section describes an exemplary feature matching procedure. Section 4.1 describes how the exemplary object/scene recognition algorithm conducts a nearest neighbor search between descriptors in the reference and query images for each batch of features detected. Sections 4.2 and 4.3, detail how the initial matches are then pruned by removing weak matches and using a clustering algorithm. Section 4.4, describes how, to further improve the robustness and stability of the algorithm, the algorithm estimates and verifies tentative homographies between the images.

4.1 Nearest Neighbor Search

Once features are detected and described, it is necessary to match them so that they can be used to recognize an object or scene. The first step of the exemplary matching procedure is to establish tentative matches based solely on the information of the k-dimensional feature descriptors $d \in \mathbb{R}^k$.

The descriptor matching problem can be formulated as the search for the reference descriptor that is closest (is the nearest neighbor) to the query descriptor. That is, if $D \subset \mathbb{R}^k$ is the set of reference descriptors and d' is the query descriptor, the nearest neighbor of d', denoted as $d^{nn}$, is defined as:

$$d^{nn} = \arg\min_{d \in D} \text{dist}(d', d) \quad (18)$$

where the Euclidean distance is used as a measure of "closeness," or similarity, between descriptors.

The problem of finding the exact nearest neighbor in a high dimensional space is hard. In fact, when the dimensionality of the space is high, no known algorithm outperforms brute force search. State of the art approaches deal with this problem by allowing for error in the nearest neighbor look up. That is, for each query descriptor d', they report "approximate" nearest neighbors that may or may not correspond to the descriptors that are closest to d'.

The Fast Library for Approximate Nearest Neighbors (FLANN) approach implements multiple methods of nearest neighbor search and can achieve very fast query times, but is not well suited to a situation, as in the present case, where the number of reference features may grow at runtime. Typical approaches, such as the original implementation of k-d Trees and the Best Bin First algorithm, use balanced k-d Trees and rely on the fact that all features in both images have been detected and described before feature matching begins. Such methods, however, are not desirable for this framework because methods of the present invention detect features in batches.

In the present example this problem is dealt with by introducing a new feature matching algorithm based on the use of an "iterative k-d Tree." This new data structure is ideal for applications in which the number of features can increase because it can be easily expanded to incorporate more reference features and stores information about previous queries so that they do not need to be rerun when new reference descriptors are introduced in the Tree.

Instead of attempting to create a balanced k-d Tree, this new algorithm creates the Tree randomly so as to ensure fast insertion of new reference descriptors. When a new reference descriptor $d^{new}$ is inserted, it first descends the Tree turning left or right at each node n by evaluating whether $d^{new}(n_d) \leq n_{thr}$ or $d^{new}(n_d) > n_{thr}$. When the descriptor to be inserted reaches a leaf, a new node n' is created and a discriminator $n'_d$ is assigned randomly. The threshold $n'_{thr}$ is assigned as the mean of the values of the new descriptor and the descriptor inside the leaf $d^{old}$ values along dimension $n'_d$. That is: $n'_{thr} = \frac{1}{2}(d^{new}(n'_d) + d^{old}(n'_d))$ is made.

Figure 16:
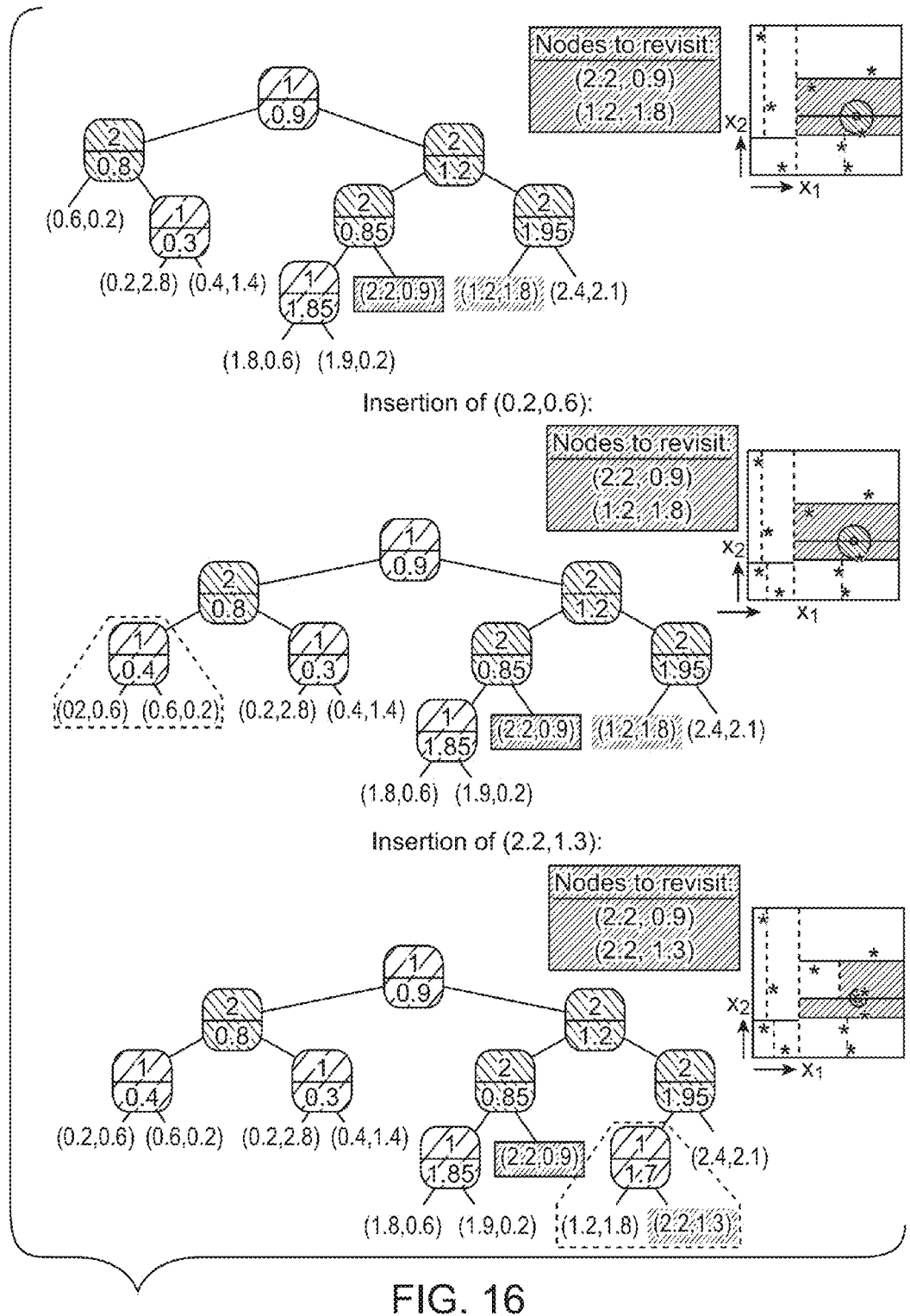
FIG. 16 is a diagram illustrating searching and inserting of nodes within an iterative k-d Tree.

The initial search on a iterative k-d Tree is similar to the search on a conventional k-d Tree except that information about previous queries is stored. For each query, the list of nodes to revisit consists of the bins that intersect the nearest neighbor hyperball. Any node outside this list is irrelevant and does not need to be searched again, even if it changes by the insertion of a new descriptor. The top of FIG. 16 illustrates the search procedure and the list of nodes to revisit. As in a best bin first (BBF) algorithm, the number of times that the algorithm backtracks is limited to $\beta$.

At the top of FIG. 16, search algorithm is similar to standard k-d Tree (the descriptor (2.2, 0.9) is determined to be the nearest neighbor) with the critical difference that nodes that cross the nearest neighbor hyperball are marked to be revisited. At the middle of FIG. 16, the insertion of the reference descriptor (0.2, 0.6) does not alter the nodes in the list to revisit and therefore it is not necessary to repeat the previous query. At the bottom of FIG. 16, the insertion of the reference descriptor (2.2, 1.3) alters the structure of one of the nodes on the list to revisit. The search for the nearest neighbor of the query node is resumed only on the new node. As a result of the search, the nearest neighbor is determined to be (2.2, 1.3), and the list of nodes to revisit is updated.

After the initial search, the insertion of more reference descriptors onto the Tree proceeds as illustrated in the middle and bottom of FIG. 16. Unlike the traditional k-d Trees, the insertion of additional nodes to the Tree does not force the previous queries to be re-run. As shown in the middle of FIG. 16, if the inserted reference descriptor does not alter any node in the list to revisit, the previous query is not affected. Moreover, as shown in the bottom of FIG. 16, even if the inserted reference descriptor changes a node in the list to revisit, it is sufficient to consider only the new node created by the insertion, instead of restarting the search.

It is noted that while the novel iterative k-d Tree algorithm just described as useful for matching visual features in the context of an iterative feature-matching scheme such as disclosed herein, as those skilled in the art will readily appreciate, this algorithm can be used in other applications, especially where data sets grow over time. For example, in an Internet context, a k-d Tree can be built for images available on webpages across the Internet. The k-d Tree can then be used to search for images having content similar to or the same as a query image. In effect, all of the images represented in the k-d Tree are reference images to which the query image is compared to find nearest neighbor matches. However, images are added to webpages all of the time, so once a traditional k-d Tree is built and searched, its results are almost immediately outdated once a new image is added to the k-d Tree because conventional k-d Tree searching requires the entire tree to be re-searched. Using the novel k-d Tree algorithm presented above to include the new images in the search, however, prevents the need to repeat an entire search by using information from the original search (i.e., the search performed prior to the addition of one or more new images to the k-d Tree) to speed-up the update. Other applications for the novel iterative k-d Tree algorithm include, among others, simultaneous location and mapping for autonomous vehicles, wherein the vehicle learns a map of the environment that is updated as it moves; automatic recognition of objects, wherein the feature database increases as more objects are recognized; etc. Those skilled in the art will undoubtedly recognize other applications in which iterative k-d Tree algorithms may decrease computational time and/or need for additional computing resources.

4.2 Removal of Weak Matches

In most practical applications simply finding the nearest neighbor of each query descriptor is not sufficient for two reasons. First, just because two features have similar descriptors it is not guaranteed that they come from the same object or scene. Different objects may look similar at the local level if, for example, they are made from the same material. Second, because the query image often contains strong movement, distortions, occlusion and background clutter, it is common to find features in the query image that are not present in the reference image. Naturally, in this case the query feature does not have a match in the database and thus any nearest neighbor algorithm produces an incorrect match.

One way to deal with this limitation is to remove the "weaker" matches by requiring a threshold on the distance to the nearest neighbor and excluding matches for which the nearest neighbor is above the threshold. Although feasible, this rule does not perform well because some descriptors are much more discriminating than others. Instead, the present example uses the ratio of the distances to the closest and second-closest neighbors and remove matches for which the ratio is too high (i.e., the closest and second-closest neighbors are at approximately the same distance, and therefore the descriptors have little discriminating power); i.e., if $d^{nn}$ is the nearest neighbor and $d^{snn}$ is the second nearest neighbor of the query descriptor d', matches are eliminated for which:

$$\frac{dist(d',d^{nn})}{dist(d',d^{snn})}H > thr_{dist} \quad (19)$$

To summarize this strategy, the descriptor matching step starts by finding, for all features in the query image, the closest and second-closest neighbor in the reference image. Each feature in the query image is matched to its closest neighbor in the reference image except when the ratio between the closest and second closest neighbors is too high, in which case the query feature is discarded 4.3 Clustering on the Affine Space with the Hough Transform The high outlier ratio after the feature matching step prevents the use, at this stage in the algorithm, robust fitting methods such as RANSAC or Least Median of Squares. Instead, this example uses the Hough Transform to reject many of the outlier matches. The Hough Transform works through a "voting" procedure. The process is started by broadly segmenting the set of matches along the location (x, y) and observation parameters ($\sigma$, t, $\phi$, $\psi$); i.e., the range of image locations and parameters is divided into large bins (or clusters) and each match is added to ("votes in") its corresponding bin. To improve robustness, each of the matches is also added to all its neighboring bins.

Through this procedure, each match "votes" in all the movement distortions that are consistent with it. Since the outliers are essentially random, it is expected that only the bins that correspond to true object matches will gather a significant number of votes. Thus, only features that correspond to bins above a minimum threshold of votes are kept.

Because this example uses large bins, all matches inside each bin are further pruned. This is done through a verification procedure using least-squares to estimate the best affine projection parameters between the matches in the bin. Matches that do not fit with this least-squares regression are removed and the affine projection is recomputed. The process is repeated until convergence. If at any time the number of matches in the bin falls below the threshold, then all of the matches inside the bin are pruned.

4.4 Homography Estimation and Verification

The previous step removed outliers by requiring that all points inside a bin in the location and observation space be loosely related by an affine transformation. To further improve the quality of the matches, all points in the image are considered and searched for multiple global distortions.

In this example the global distortions between the image are modeled by multiple homographies. The homography transformation is more general than the affine transformation and can model (assuming an ideal pin-hole camera) the general transformation between one plane in two images.

In one example RANSAC is used to estimate multiple homographies between points in the images. To verify that each detected homography is correct, a new query image is created that simulates its effects; i.e., each homography is inverted and the inverted homography is applied to the query image. This process yields a "normalized" query image in approximately the same pose as the reference image and therefore makes the recognition task much easier.

To verify that the matches were correct, the algorithm attempts to match this "normalized" query image to the original reference image. Since the pose of the "normalized" query image is consistent with the pose of the reference image, it is not necessary to use a general affine model for this second feature matching operation. Instead, the algorithm uses the simpler scale-plus rotation model by making t=1 and $\phi$=0 in the feature detection and description steps.

if a significant number of matches are not found in the new query image, the homography and all the matches that were consistent with it are discarded. If, on the other hand, a large number of matches are found, then they are kept and reported by the algorithm. If the number of matches is between these two extremes, then the process is repeated; i.e., the matches detected in the new query image are used to estimate a new homography and that homography is used to estimate a new "normalized" query image that will be analyzed against the original reference image. This procedure is repeated for each of the homographies found in the original images.

5. Overview of the Exemplary Object/Scene Recognition Algorithm

To summarize, the following high level overview of an exemplary object/scene recognition algorithm is presented:

1. (Initialization)

For each input image, compute a set of 8 rotated integral images as described in Section 1.4, 2. (Feature Detection and Description)

Using the algorithms presented in Sections 3.1, 3.2, and 3.3, detect, compute the orientation of and create a descriptor for, a batch of N' features in each of the images.

3, (Feature Matching)
  Search for matches between all previously detected features in the reference and query images.
4. (Homography Estimation and Verification)
  Using the techniques detailed in Section 4.4, attempt to detect and identify homographies in the image.
5. (Decision)
  If the number of matches detected and verified is below a threshold $N_{min}$, return to step 2; Otherwise, report all matches found.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of matching visual features within a first image with visual features within a second image, comprising:
  starting with a coarse sample, automatedly iteratively sampling visual features of each of the first and second images so as to continually increase sampling density of said sampling; and
  continuing said sampling until at least a desired number of unambiguous matches has been found between batches of the visual features of the first and second images detected in iterations of said iterative sampling;
  wherein:
    said sampling includes finding discriminative regions of each of the first and second images; and
    said finding discriminative regions includes finding extrema of a function.

2. A method according to claim 1, wherein the function is a function of scale and tilt.

3. A method according to claim 1, wherein the function is a function of scale and object-plane rotation.

4. A method according to claim 1, wherein said finding extrema of a function includes finding extrema of an affine-space function.

5. A method according to claim 4, wherein the affine-space function is a function of scale, tilt, and object-plane rotation.

6. A method according to claim 1, wherein said sampling includes iteratively detecting successive batches of features in the first and second images.

7. A method according to claim 6, wherein said detecting includes iteratively detecting successive batches using a greedy algorithm.

8. A method according to claim 7, wherein said detecting includes searching for local extrema in first and second space-functions for corresponding respective ones of the first and second images.

9. A method according to claim 8, wherein said detection includes using a filter bank to compute values of a space-function at a plurality of points within each of the first and second images.

10. A method according to claim 9, wherein said detecting further includes using the filter bank to compute values of the space-function of nearest-neighbors of each of the plurality of points for a single scale value until convergence.

11. A method according to claim 10, wherein said detecting further includes using the filter bank to compute values of the space-function of nearest neighbors at scale values adjacent the single scale value.

12. A method according to claim 9, further comprising constructing the filter bank using box filters.

13. A method according to claim 1, further comprising searching for matches of visual features in a batch of features sampled for the first image with visual features in a batch of features sampled for the second image using a nearest neighbor searching algorithm.

14. A method according to claim 13, wherein said searching includes searching for matches using an iterative k-d Tree.

15. A method according to claim 14, wherein said searching for matches using an iterative k-d Tree includes keeping a list of nodes of the iterative k-d Tree to be revisited when at least one new node is added to the iterative k-d Tree.

16. A method according to claim 15, wherein said searching for matches using an iterative k-d Tree further includes identifying a nearest-neighbor hyperball and revisiting only bins that intersect the nearest-neighbor hyperball.

17. An object/scene recognition method, comprising:
  1) automatedly generating a batch of feature descriptors for a plurality of sampled visual features of a first image;
  2) automatedly generating a batch of feature descriptors for a plurality of sampled visual features of a second image;
  3) automatedly performing a matching algorithm on the batches in attempt to find matches between the feature descriptors in the batch corresponding to the first image and the feature descriptors in the batch corresponding to the second image;
  4) automatedly assessing the quality of matches; and
  if the quality of the matches does not meet a threshold, automatedly repeating said steps 1 through 4 with differing sets of batches until the quality of the matches meets or exceeds the threshold:,
  wherein:
    said steps 1 and 2 include finding discriminative regions of each of the first and second images; and
    said finding discriminative regions includes finding extrema of a function.

18. A method according to claim 17, wherein the function is a function of scale and tilt.

19. A method according to claim 17, wherein the function is a function of scale and object-plane rotation.

20. A method according to claim 17, wherein said finding extrema of a function includes finding extrema of an affine-space function.

21. A method according to claim 20, wherein the affine-space function is a function of scale, tilt, and object-plane rotation.

22. A method according to claim 17, wherein said steps 1 and 2 include generating a set of rotated integer images for each of the first and second images.

23. A method according to claim 22, wherein each of said steps 1 and 2 includes sampling the corresponding one of the first and second images by applying an affine-space function to the corresponding set of rotated integer images.

24. A method according to claim 23, wherein said sampling includes applying a bank of filters to the affine-space function.

25. A method according to claim 24, wherein said applying a bank of filters includes applying a set of approximated box filters to the affine-space function.

26. A method according to claim 17, wherein each of said steps 1 and 2 includes detecting visual features in the first and second images using a greedy algorithm.

27. A method according to claim 17, wherein each of said steps 1 and 2 includes generating an orientation for each of the plurality of features.

28. A method according to claim 17, wherein said step 3 includes performing a nearest-neighbor search for the feature descriptors as between the batches for the first and second images.

29. A method according to claim 28, wherein said performing a nearest-neighbor search includes performing a nearest-neighbor search using an iterative k-d Tree.

30. A method according to claim 29, wherein said performing a nearest-neighbor search using an iterative k-d Tree includes keeping a list of nodes of the iterative k-d Tree to be revisited when at least one new node is added to the iterative k-d Tree.

31. A method according to claim 30, wherein said searching for matches using an iterative k-d Tree further includes identifying a nearest-neighbor hyperball and revisiting only bins that intersect the nearest-neighbor hyperball.

32. A computerized method of identifying, from a plurality of reference descriptors, a nearest neighbor to a query descriptor, the computerized method comprising:
   automatedly generating an initial k-d Tree from an initial set of the plurality of reference descriptors and storing the initial k-d Tree in a memory;
   automatedly searching the initial k-d Tree for an initial nearest-neighbor of the initial set to the query descriptor;
   automatedly identifying a hyperball as a function of the initial nearest-neighbor;
   automatedly generating a list of nodes to revisit as a function of the hyperball and storing the list in a memory;
   adding at least one of the plurality of reference descriptors that is not in the initial set to the initial k-d Tree to create an expanded k-d Tree containing the initial k-d Tree as an initial portion; and
   subsequent to said adding, searching the initial portion of the expanded k-d Tree using only nodes in the list of nodes to revisit.

33. A computerized method according to claim 32, wherein said automatedly generating a list of nodes to revisit includes generating a list of nodes that contain only nodes that intersect the hyperball.

34. A machine-readable storage medium comprising machine-executable instructions for performing an object/scene recognition method, said machine executable instructions comprising:
   a first set of machine-executable instructions for performing at least the following steps:
   1) generate a batch of feature descriptors for a plurality of sampled visual features of a first image;
   2) generate a batch of feature descriptors for a plurality of sampled visual features of a second image;
   3) perform a matching algorithm on the batches in attempt to find matches between the feature descriptors in the batch corresponding to the first image and the feature descriptors in the batch corresponding to the second image;
   4) assess the quality of matches; and
   a second set of machine-executable instructions for determining if quality of the matches meets a threshold and automatedly repeating said steps 1 through 4 with differing sets of batches until the quality of the matches meets or exceeds the threshold;
   wherein:
       machine-executable instructions of said first set of machine-executable instructions for said steps 1 and 2 include machine-executable instructions for finding discriminative regions of each of the first and second images; and
       said machine-executable instructions for finding discriminative regions includes machine-executable instructions finding extrema of a function.

35. A machine-readable storage medium according to claim 34, wherein the function is a function of scale and tilt.

36. A machine-readable storage medium according to claim 34, wherein the function is a function of scale and object-plane rotation.

37. A machine-readable storage medium according to claim 34, wherein said machine-executable instructions for finding extrema of a function includes machine-executable instructions for finding extrema of an affine-space function.

38. A machine-readable storage medium according to claim 37, wherein the affine-space function is a function of scale, tilt, and object-plane rotation.

39. A machine-readable storage medium according to claim 34, wherein machine-executable instructions of the first set of machine-executable instructions for said steps 1 and 2 include machine-executable instructions for generating a set of rotated integer images for each of the first and second images.

40. A machine-readable storage medium according to claim 39, wherein machine-executable instructions of the first set of machine-executable instructions for each of said steps 1 and 2 includes machine-executable instructions for sampling the corresponding one of the first and second images by applying an affine-space function to the corresponding set of rotated integer images.

41. A machine-readable storage medium according to claim 40, wherein said machine-executable instructions for sampling includes machine-executable instructions for applying a bank of filters to the affine-space function.

42. A machine-readable storage medium according to claim 41, wherein said machine-executable instructions for applying a bank of filters includes machine-executable instructions for applying a set of approximated box filters to the affine-space function.

43. A machine-readable storage medium according to claim 42, wherein machine-executable instructions of the first set of machine-executable instructions for each of said steps 1 and 2 includes detecting visual features in the first and second images using a greedy algorithm.

44. A machine-readable storage medium according to claim 34, wherein machine-executable instructions of the first set of machine-executable instructions for each of said steps 1 and 2 includes machine-executable instructions for generating an orientation for each of the plurality of features.

45. A machine-readable storage medium according to claim 34, wherein machine-executable instructions of the first set of machine-executable instructions for said step 3 includes machine-executable instructions for performing a nearest-neighbor search for the feature descriptors as between the batches for the first and second images.

46. A machine-readable storage medium according to claim 45, wherein said machine-executable instructions for performing a nearest-neighbor search includes machine-executable instructions for performing a nearest-neighbor search using an iterative k-d Tree.

47. A machine-readable storage medium according to claim 46, wherein said machine-executable instructions for performing a nearest-neighbor search using an iterative k-d Tree includes machine-executable instructions for keeping a list of nodes of the iterative k-d Tree to be revisited when at least one new node is added to the iterative k-d Tree.

48. A machine-readable storage medium according to claim 47, wherein said machine-executable instructions for searching for matches using an iterative k-d Tree further includes machine-executable instructions for identifying a nearest-neighbor hyperball and revisiting only bins that intersect the nearest-neighbor hyperball.

49. A machine-readable storage medium containing machine-executable instructions for performing a method of identifying, from a plurality of reference descriptors, a nearest neighbor to a query descriptor, the machine-executable instructions comprising:
- a first set of machine-executable instructions for generating an initial k-d Tree from an initial set of the plurality of reference descriptors and storing the initial k-d Tree in a memory;
- a second set of machine-executable instructions for searching the initial k-d Tree for an initial nearest-neighbor of the initial set to the query descriptor;
- a third set of machine-executable instructions for identifying a hyperball as a function of the initial nearest-neighbor;
- a fourth set of machine-executable instructions for generating a list of nodes to revisit as a function of the hyperball and storing the list in a memory;
- a fifth set of machine-executable instructions for adding at least one of the plurality of reference descriptors that is not in the initial set to the initial k-d Tree to create an expanded k-d Tree containing the initial k-d Tree as an initial portion; and
- a sixth set of machine-executable instructions for, subsequent to said adding, searching the initial portion of the expanded k-d Tree using only nodes in the list of nodes to revisit.

50. A machine-readable storage medium according to claim 49, wherein said fourth set of machine-executable instructions includes machine-executable instructions for generating a list of nodes that contain only nodes that intersect the hyperball.

* * * * *